No. 896,974. PATENTED AUG. 25, 1908.
O. DAMON & W. L. SHOUP.
AUTOMATIC OIL CUP.
APPLICATION FILED NOV. 26, 1907.
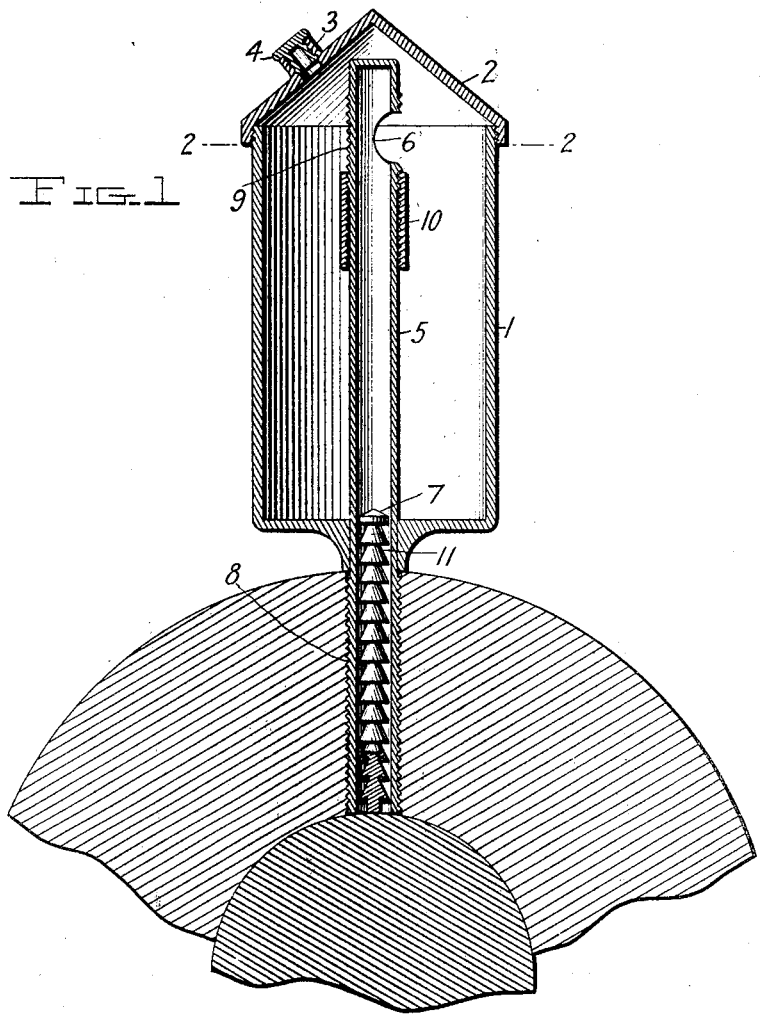
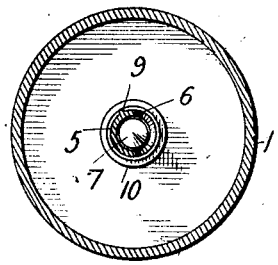
Inventors
Oscar Damon and
William L. Shoup.

UNITED STATES PATENT OFFICE.

OSCAR DAMON AND WILLIAM L. SHOUP, OF LANGDON, KANSAS.

AUTOMATIC OIL-CUP.

No. 896,974.　　　　Specification of Letters Patent.　　　Patented Aug. 25, 1908.

Application filed November 26, 1907. Serial No. 403,950.

*To all whom it may concern:*

Be it known that we, OSCAR DAMON and WILLIAM L. SHOUP, citizens of the United States, residing at Langdon, in the county of Reno, State of Kansas, have invented certain new and useful Improvements in Automatic Oil-Cups; and we do hereby declare the following to be a full, clear, and exact description of the invention, such as will enable others skilled in the art to which it appertains to make and use the same.

This invention is designed to be attached to the hub of a vehicle wheel and other devices where it is necessary that the spindle on which the wheel turns should be kept constantly lubricated.

Furthermore, the invention consists of improvements in lubricators that are automatic in their action.

It is the object of the invention to provide improvements that will be entirely efficient, simple in their organization, ready of attachment and other manipulations and certain in their action or mode of operation.

The nature is clearly shown in the annexed drawings forming a part of this specification and to which reference is made.

Of the said drawings—Figure 1 is a vertical central sectional view of a feed-cup showing our improved appliances. Fig. 2 is a horizontal view, taken in the plane 2 2, of Fig. 1.

Similar reference characters designate similar parts or features, as the case may be, wherever they occur.

In carrying out the invention we provide a suitable oil-cup, 1, which it may be desirable to equip with a conical cap, 2, that may be provided with a supply hole, 3, closed by a suitable air-tight plug, 4. The parts and features mentioned may be differently shaped or arranged, so long as they are suited to the improvements.

5 designates the feed-pipe in the oil-cup and having a hole, 6, in its side as near the top as may be practicable to receive oil from the cup and convey it to the spindle of the wagon to be lubricated.

The oil-tube 5 extends below the bottom of the cup and its lower end is threaded, as at 8, to permit it to be tapped into the hub.

The feed-pipe is screw-threaded at its upper end portion 9 to receive a thimble 10, thereon to be screwed up and down on the pipe to regulate the size of the hole 6, near the top, in a well-known way, and thus regulating the amount of oil supplied to the tube.

Placed within the oil in the feed-tube 5 is a plunger-rod consisting of a rod of steel or other suitable material having formed thereon throughout its length a series of hollow cones or conical cups opening downwardly.

As the wheel of the wagon turns on its spindle, the cup will be inverted and the plunger will drop by the operation of gravity to the outer end of the tube 5 into which the oil runs through the opening 6 and floods the rod, and as the wheel continues its rotation and the cup is brought around to a vertical position again the rod again drops to the inner end of the tube and against the journal, each cup carrying a small quantity of the oil which it deposits upon the journal, and this action is repeated at each revolution of the wheel. By this means a small quantity of the oil is positively carried from the oil cup to the journal at each revolution of the wheel, and waste and flooding of the journal thus avoided.

The improved device is simple in construction, can be inexpensively manufactured and adapted to all the different varieties of wheels or other devices which rotate upon a stationary journal, but as above stated, is more particularly designed for use upon vehicle hubs.

What is claimed is—

1. A plunger for the tubes of lubricating cups consisting of a rod having formed thereon a series of hollow cones.

2. The combination with a wheel and its spindle, of a lubricating cup having a feed tube communicating with the spindle, and a plunger operating in the tube and consisting of a rod having formed thereon a series of hollow cones.

In testimony whereof, we affix our signatures, in presence of two witnesses.

OSCAR DAMON.
　　　　　　　　　WILLIAM L. SHOUP.

Witnesses:
　FRENCH MCCLENAGAN,
　HATTIE M. FERGUSON.